US008144445B2

(12) United States Patent
Caggiano et al.

(10) Patent No.: US 8,144,445 B2

(45) Date of Patent: Mar. 27, 2012

(54) MICRO-ELECTROMECHANICAL SYSTEM BASED SWITCHING

(75) Inventors: Robert Joseph Caggiano, Wolcott, CT (US); William James Premerlani, Scotia, NY (US); Marcelo Esteban Valdes, Burlington, CT (US); Kanakasabapathi Subramanian, Clifton Park, NY (US); Brent Charles Kumfer, Farmington, CT (US); Charles Stephan Pitzen, Avon, CT (US); John Norton Park, Rexford, NY (US)

(73) Assignee: General Electric Company, Schenectady, NY (US)

( * ) Notice: Subject to any disclaimer, the term of this patent is extended or adjusted under 35 U.S.C. 154(b) by 806 days.

(21) Appl. No.: 11/761,617

(22) Filed: Jun. 12, 2007

(65) Prior Publication Data

US 2008/0309438 A1 Dec. 18, 2008

(51) Int. Cl.

*H01H 73/00* (2006.01)
*H01H 57/00* (2006.01)
*H02H 9/02* (2006.01)

(52) U.S. Cl. ........................ 361/115; 361/93.1; 200/181

(58) Field of Classification Search .................. 361/115, 361/93.1; 200/181

See application file for complete search history.

(56) References Cited

U.S. PATENT DOCUMENTS 3,496,409 A 2/1970 Connell .......................... 315/36
4,351,013 A * 9/1982 Matsko et al. .................. 361/96
4,384,289 A 5/1983 Stillwell et al.
4,723,187 A 2/1988 Howell
4,827,272 A 5/1989 Davis
4,847,780 A 7/1989 Gilker et al.
5,374,792 A 12/1994 Ghezzo et al.
5,426,360 A 6/1995 Maraio et al.
5,430,597 A 7/1995 Bagepalli et al. ............... 361/93
5,454,904 A 10/1995 Ghezzo et al.
5,502,374 A 3/1996 Cota
5,889,643 A 3/1999 Elms
5,940,260 A 8/1999 Gelbien et al.
5,943,223 A 8/1999 Pond (Continued)

FOREIGN PATENT DOCUMENTS

DE 19850397 A1 5/2000

(Continued)

OTHER PUBLICATIONS

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

(Continued)

*Primary Examiner* — Jared Fureman
*Assistant Examiner* — Scott Bauer
(74) *Attorney, Agent, or Firm* — Cantor Colburn LLP

(57) ABSTRACT

A current control device is disclosed. The current control device includes control circuitry and a current path integrally arranged with the control circuitry. The current path includes a set of conduction interfaces and a micro electromechanical system (MEMS) switch disposed between the set of conduction interfaces. The set of conduction interfaces have geometry of a defined fuse terminal geometry and include a first interface disposed at one end of the current path and a second interface disposed at an opposite end of the current path. The MEMS switch is responsive to the control circuitry to facilitate the interruption of an electrical current passing through the current path.

8 Claims, 7 Drawing Sheets

U.S. PATENT DOCUMENTS

| | | | | |
|---|---|---|---|---|
| 5,973,896 | A | 10/1999 | Hirsh et al. | |
| 6,054,659 | A | 4/2000 | Lee et al. | |
| 6,275,366 | B1 | 8/2001 | Gelbien et al. | |
| 6,563,683 | B1 | 5/2003 | Strumpler | 361/93.1 |
| 6,738,246 | B1 | 5/2004 | Strumpler | 361/93.1 |
| 6,904,471 | B2 | 6/2005 | Boggs et al. | 710/8 |
| 2001/0014949 | A1 | 8/2001 | Leblanc | |
| 2002/0008149 | A1 | 1/2002 | Riley et al. | |
| 2002/0145841 | A1 | 10/2002 | Williams et al. | |
| 2003/0050737 | A1 | 3/2003 | Osann, Jr. | |
| 2003/0183838 | A1 * | 10/2003 | Huang et al. | 257/107 |
| 2003/0212473 | A1 | 11/2003 | Vandevanter | |
| 2004/0032320 | A1 | 2/2004 | Zalitzky et al. | |
| 2004/0113713 | A1 | 6/2004 | Zipper et al. | |
| 2004/0263125 | A1 | 12/2004 | Kanno et al. | |
| 2005/0063107 | A1 * | 3/2005 | Benke | 361/2 |
| 2005/0085928 | A1 | 4/2005 | Shani | 700/18 |
| 2005/0248340 | A1 | 11/2005 | Berkcan et al. | 324/259 |
| 2005/0270014 | A1 | 12/2005 | Zribi et al. | 324/126 |
| 2006/0121785 | A1 | 6/2006 | Caggiano et al. | |
| 2006/0187688 | A1 | 8/2006 | Tsuruya | 363/56.12 |
| 2006/0202933 | A1 | 9/2006 | Pasch et al. | 345/94 |
| 2007/0013357 | A1 | 1/2007 | Huang et al. | 323/318 |
| 2007/0018761 | A1 * | 1/2007 | Yamanaka et al. | 335/78 |
| 2007/0057746 | A1 | 3/2007 | Rubel | |
| 2007/0142938 | A1 | 6/2007 | Huang | 700/40 |
| 2007/0173960 | A1 | 7/2007 | Kumar | 700/40 |

FOREIGN PATENT DOCUMENTS

| | | | |
|---|---|---|---|
| DE | 19927762 | A1 | 1/2001 |
| EP | 0072422 | A1 | 2/1983 |
| EP | 0233756 | A1 | 8/1987 |
| EP | 0774822 | A1 | 5/1997 |
| EP | 1255268 | A1 | 11/2002 |
| EP | 1610142 | A1 | 12/2005 |
| EP | 1643324 | A2 | 4/2006 |
| EP | 1681694 | A1 | 7/2006 |
| GB | 2123627 | A | 2/1984 |
| WO | 9946606 | A2 | 9/1999 |
| WO | 0004392 | A1 | 1/2000 |
| WO | 2006078944 | A2 | 7/2006 |
| WO | 2006100192 | A1 | 9/2006 |

OTHER PUBLICATIONS

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-6.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Authority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

USPTO Office Action dated Oct. 17, 2008; Filing Date: Jun. 19, 2007; First Named Inventor: William James Premerlani.

USPTO Office Action dated Oct. 24, 2008; Filing Date: Jun. 15, 2007; First Named Inventor: William James Permerlani.

USPTO Office Action dated Oct. 28, 2008; Filing Date: Jun. 8, 2007; First Named Inventor: Cecil Rivers, Jr.

European Search Report for European Application No. 07110554.8; European Filing Date of Oct. 19, 2007; Mailing Date of Oct. 30, 2007; (6 pgs).

George G. Karady, and G.T. Heydt, "Novel Concept for Medium Voltage Circuit Breakers Using Microswitches," IEEE Transactions on Power Delivery, vol. 21, No. 1, Jan. 2006.

* cited by examiner

MICRO-ELECTROMECHANICAL SYSTEM BASED SWITCHING

BACKGROUND OF THE INVENTION

Embodiments of the invention relate generally to a switching device for switching off a current in a current path, and more particularly to micro-electromechanical system based switching devices.

To protect against damage, electrical equipment and wiring can be protected from conditions that result in current levels above their ratings. Over-current conditions can be classified by the time required before damage occurs and may be grouped into two categories: timed over-current conditions and instantaneous over-current conditions.

Timed over-current conditions or faults are deemed the less severe variety and generally require distribution protection equipment to deactivate the current path after a given time period, which depends on the level of the condition. Timed over-current faults typically include current levels just above the current rating, and may extend to and beyond 8-10 times the current rating of the distribution protection equipment. The system cabling and equipment can typically handle these conditions for a period of time, but the distribution protection equipment is designed to deactivate the current path if the current levels don't timely recede. Typically, timed faults can result from mechanically overloaded equipment or high impedance paths between opposite polarity lines (line to line, line to ground, or line to neutral).

Instantaneous over-current conditions, also termed short circuit faults, are severe faults and typically involve current levels greater than 10 times the rated current of the distribution protection equipment. These faults typically result from low impedance paths between opposite polarity lines. Short circuit faults involve extreme currents, can be extremely damaging to equipment and personnel, and therefore should be removed as quickly as possible. Minimizing response time, and thus the let-through energy, during a short circuit fault is of primary concern. Presently, two devices, fuses and circuit breakers, offer over-current protection for electrical equipment and wiring.

Fuses are typically more selective than circuit breakers and provide less variation in response to short circuit conditions, but must be replaced after they perform their protective functions. Fuses come in many shapes and sizes but are designed into fuse holders that allow them to snap-in and snap-out for ease of replacement. Manufacturers adhere to standard dimensions for the fuses and holders dependent on the fuse type and rating, making drop-in replacements easy.

Fuses are designed with series elements that melt at a prescribed overcurrent and thus open the current path. Fuses are thus by design single-phase devices, leading to potential issues when used in a poly-phase system, in which each fuse operates independent of the others. In many applications such as motor loads, losing one phase of power will lead to an increase in demand on the other phases. The increased demand on the other phases increases the risk of damage. For example motor loads may continue to run with a lost phase, causing additional heating and stress on the remaining phases.

For increased convenience, fuses have been replaced by circuit breakers in many applications. While circuit breakers provide similar protection and the convenience of being able to be reset rather than replaced after they operate or trip, they typically include complex mechanical systems with comparatively slow response times, in relation to fuses, and less selectivity between upstream and downstream circuit breakers during short circuit faults.

The electronic fault sensing method in breakers having electronic trip units typically involves some computation time that increases the decision time and thus reaction time to a fault. In addition, once the decision is made to trip, the mechanical systems are comparatively slow to respond due to mechanical intertia. Accordingly, in response to a short-circuit, a circuit breaker can allow comparatively larger amounts of energy (known as let-through energy) to pass through the circuit breaker.

A contactor is an electrical device designed to switch an electrical load ON and OFF on command. Traditionally, electromechanical contactors are employed in control gear, where the electromechanical contactors are capable of handling switching currents up to their interrupting capacity. Electromechanical contactors may also find application in power systems for switching currents. However, fault currents in power systems are typically greater than the interrupting capacity of the electromechanical contactors. Accordingly, to employ electromechanical contactors in power system applications, it may be desirable to protect the contactor from damage by backing it up with a series device that is sufficiently fast acting to interrupt fault currents prior to the contactor opening at all values of current above the interrupting capacity of the contactor.

Previously conceived solutions to facilitate use of contactors in power systems include vacuum contactors, vacuum interrupters and air break contactors, for example. Unfortunately, contactors such as vacuum contactors do not lend themselves to easy visual inspection as the contactor tips are encapsulated in a sealed, evacuated enclosure. Further, while the vacuum contactors are well suited for handling the switching of large motors, transformers and capacitors, they are known to cause undesirable transient overvoltages, particularly when the load is switched off.

Furthermore, the electromechanical contactors generally use mechanical switches. However, as these mechanical switches tend to switch at a relatively slow speed, predictive techniques are employed in order to estimate occurrence of a zero crossing, often tens of milliseconds before the switching event is to occur, in order to facilitate opening/closing at the zero crossing for reduced arcing. Such zero crossing prediction is prone to error as many transients may occur in this prediction time interval.

As an alternative to slow mechanical and electromechanical switches, fast solid-state switches have been employed in high speed switching applications. As will be appreciated, these solid-state switches switch between a conducting state and a non-conducting state through controlled application of a voltage or bias. For example, by reverse biasing a solid-state switch, the switch may be transitioned into a non-conducting state. However, since solid-state switches do not create a physical gap between contacts when they are switched into a non-conducing state, they experience leakage current. Furthermore, due to internal resistances, when solid-state switches operate in a conducting state, they experience a voltage drop. Both the voltage drop and leakage current contribute to the generation of excess heat under normal operating circumstances, which may effect switch performance and life. Moreover, due at least in part to the inherent leakage current associated with solid-state switches, their use in circuit breaker applications is not practical.

Accordingly, there exists a need in the art for a current switching circuit protection arrangement to overcome these drawbacks.

BRIEF DESCRIPTION OF THE INVENTION

An embodiment of the invention includes a current control device. The current control device includes control circuitry and a current path integrally arranged with the control circuitry. The current path includes a set of conduction interfaces and a micro electromechanical system (MEMS) switch disposed between the set of conduction interfaces. The set of conduction interfaces have geometry of a defined fuse terminal geometry and include a first interface disposed at one end of the current path and a second interface disposed at an opposite end of the current path. The MEMS switch is responsive to the control circuitry to facilitate the interruption of an electrical current passing through the current path.

Another embodiment of the invention includes a method of controlling an electrical current passing through a current path having a set of conduction interfaces with geometry of a defined fuse terminal geometry. The method includes measuring the electrical current via control circuitry arranged integrally with the current path and facilitating interrupting of the electrical current via a MEMS switch disposed between the set of conduction interfaces and responsive to the control circuitry.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

An embodiment of the invention provides an electrical protection device suitable for electrical distribution systems. The proposed device is packaged such that it can be retrofitted for use within existing fuse holders, or to replace existing fuse applications. Use of micro electromechanical system (MEMS) switches provide fast response time, thereby facilitating diminishing the let-through energy of an interrupted fault. A Hybrid Arcless Limiting Technology (HALT) circuit connected in parallel with the MEMS switches provides capability for the MEMS switches to be opened or closed without arcing at any given time regardless of current or voltage.

Figure 1:
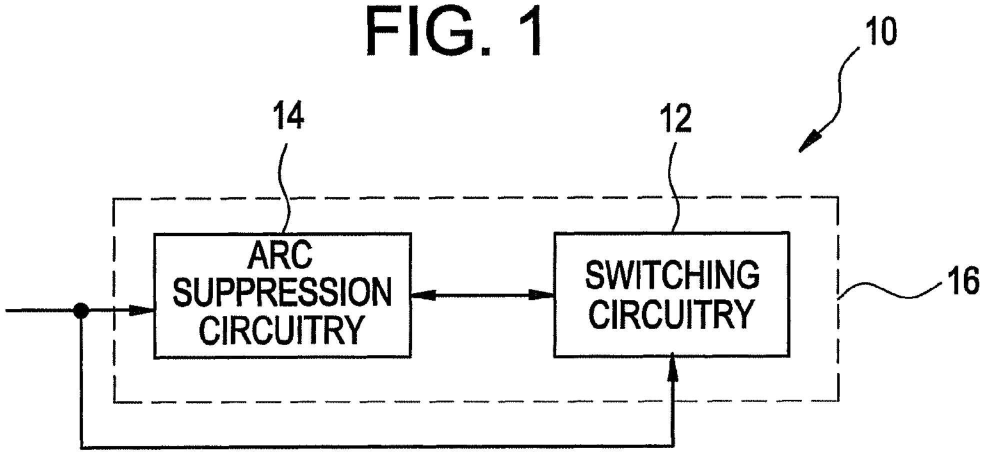
FIG. 1 is a block diagram of an exemplary MEMS based switching system in accordance with an embodiment of the invention.

FIG. 1 illustrates a block diagram of an exemplary arc-less micro-electromechanical system switch (MEMS) based switching system 10, in accordance with aspects of the present invention. Presently, MEMS generally refer to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, for example, structures that may be smaller than 100 nanometers in size. Accordingly, even though example embodiments described throughout this document may refer to MEMS-based switching devices, it is submitted that the inventive aspects of the present invention should be broadly construed and should not be limited to micron-sized devices.

As illustrated in FIG. 1, the arc-less MEMS based switching system 10 is shown as including MEMS based switching circuitry 12 and arc suppression circuitry 14, where the arc suppression circuitry 14, alternatively referred to as a Hybrid Arcless Limiting Technology (HALT) device, is operatively coupled to the MEMS based switching circuitry 12. In certain embodiments, the MEMS based switching circuitry 12 may be integrated in its entirety with the arc suppression circuitry 14 in a single package 16, for example. In other embodiments, only certain portions or components of the MEMS based switching circuitry 12 may be integrated with the arc suppression circuitry 14.

In a presently contemplated configuration as will be described in greater detail with reference to FIG. 2, the MEMS based switching circuitry 12 may include one or more MEMS switches. Additionally, the arc suppression circuitry 14 may include a balanced diode bridge and a pulse circuit. Further, the arc suppression circuitry 14 may be configured to facilitate suppression of an arc formation between contacts of the one or more MEMS switches by receiving a transfer of electrical energy from the MEMS switch in response to the MEMS switch changing state from closed to open. It may be noted that the arc suppression circuitry 14 may be configured to facilitate suppression of an arc formation in response to an alternating current (AC) or a direct current (DC).

Figure 2:
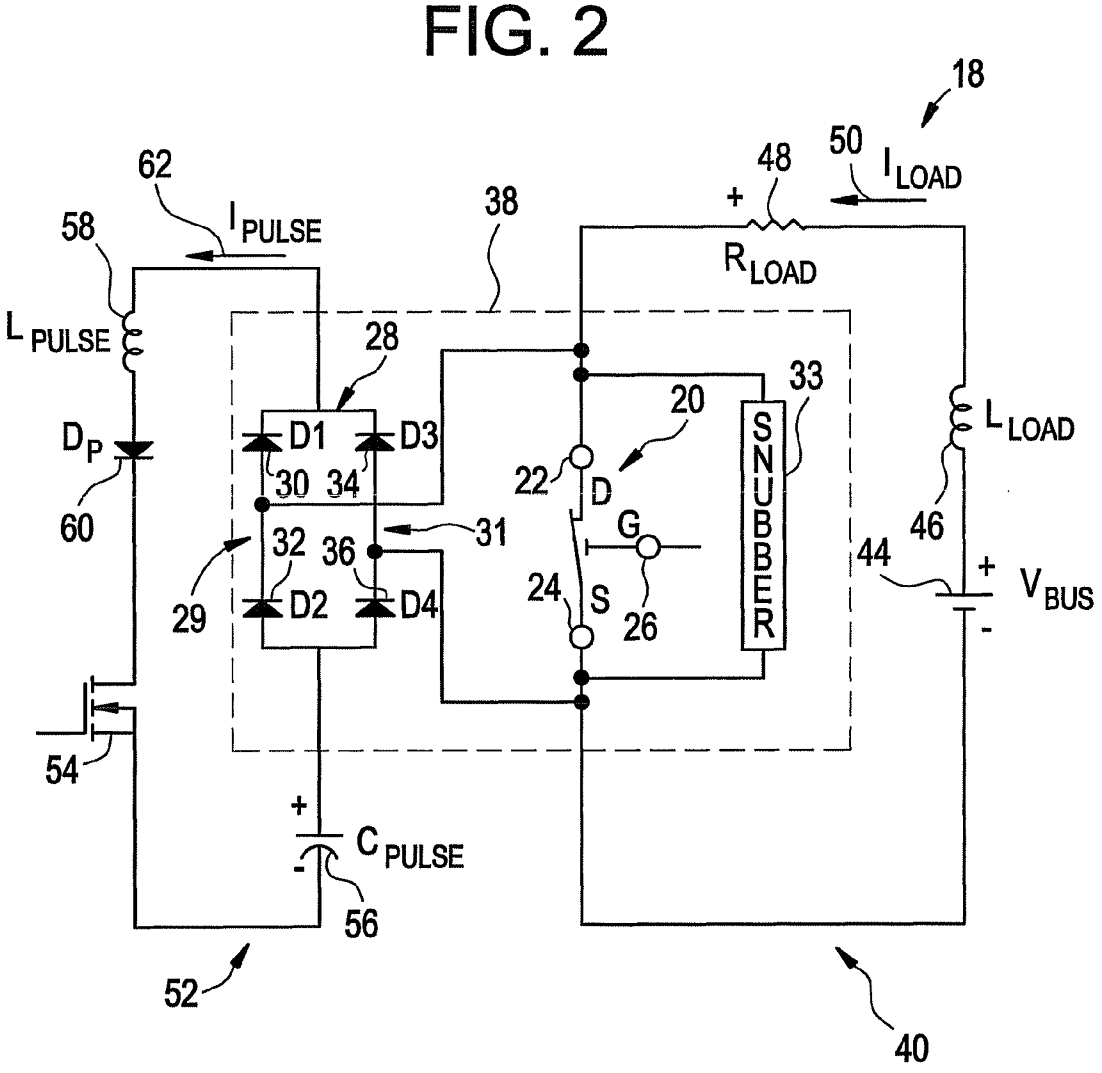
FIG. 2 is schematic diagram illustrating the exemplary MEMS based switching system depicted in FIG. 1.

Turning now to FIG. 2, a schematic diagram 18 of the exemplary arc-less MEMS based switching system depicted in FIG. 1 is illustrated in accordance with one embodiment. As noted with reference to FIG. 1, the MEMS based switching circuitry 12 may include one or more MEMS switches. In the illustrated embodiment, a first MEMS switch 20 is depicted as having a first contact 22, a second contact 24 and a third contact 26. In one embodiment, the first contact 22 may be configured as a drain, the second contact 24 may be configured as a source and the third contact 26 may be configured as a gate. Furthermore, as illustrated in FIG. 2, a voltage snubber circuit 33 may be coupled in parallel with the MEMS switch 20 and configured to limit voltage overshoot during fast contact separation as will be explained in greater detail hereinafter. In certain embodiments, the snubber circuit 33 may include a snubber capacitor (see 76, FIG. 4) coupled in series with a snubber resistor (see 78, FIG. 4). The snubber capacitor may facilitate improvement in transient voltage sharing during the sequencing of the opening of the MEMS switch 20. Furthermore, the snubber resistor may suppress any pulse of current generated by the snubber capacitor during closing operation of the MEMS switch 20. In certain other embodiments, the voltage snubber circuit 33 may include a metal oxide varistor (MOV) (not shown).

In accordance with further aspects of the present technique, a load circuit 40 may be coupled in series with the first MEMS switch 20. The load circuit 40 may include a voltage source $V_{BUS}$ 44. In addition, the load circuit 40 may also include a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $I_{LOAD}$ that may flow through the load circuit 40 and the first MEMS switch 20.

Further, as noted with reference to FIG. 1, the arc suppression circuitry 14 may include a balanced diode bridge. In the illustrated embodiment, a balanced diode bridge 28 is depicted as having a first branch 29 and a second branch 31. As used herein, the term "balanced diode bridge" is used to represent a diode bridge that is configured such that voltage drops across both the first and second branches 29, 31 are substantially equal. The first branch 29 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In one embodiment, the first MEMS switch 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Furthermore, the first MEMS switch 20 and the balanced diode bridge 28 may be tightly packaged to facilitate minimization of parasitic inductance caused by the balanced diode bridge 28 and in particular, the connections to the MEMS switch 20. It may be noted that, in accordance with exemplary aspects of the present technique, the first MEMS switch 20 and the balanced diode bridge 28 are positioned relative to one another such that the inherent inductance between the first MEMS switch 20 and the balanced diode bridge 28 produces a di/dt voltage less than a few percent of the voltage across the drain 22 and source 24 of the MEMS switch 20 when carrying a transfer of the load current to the diode bridge 28 during the MEMS switch 20 turn-off which will be described in greater detail hereinafter. In one embodiment, the first MEMS switch 20 may be integrated with the balanced diode bridge 28 in a single package 38 or optionally, the same die with the intention of minimizing the inductance interconnecting the MEMS switch 20 and the diode bridge 28.

Additionally, the arc suppression circuitry 14 may include a pulse circuit 52 coupled in operative association with the balanced diode bridge 28. The pulse circuit 52 may be configured to detect a switch condition and initiate opening of the MEMS switch 20 responsive to the switch condition. As used herein, the term "switch condition" refers to a condition that triggers changing a present operating state of the MEMS switch 20. For example, the switch condition may result in changing a first closed state of the MEMS switch 20 to a second open state or a first open state of the MEMS switch 20 to a second closed state. A switch condition may occur in response to a number of actions including but not limited to a circuit fault or switch ON/OFF request.

The pulse circuit 52 may include a pulse switch 54 and a pulse capacitor $C_{PULSE}$ 56 series coupled to the pulse switch 54. Further, the pulse circuit may also include a pulse inductance $L_{PULSE}$ 58 and a first diode $D_P$ 60 coupled in series with the pulse switch 54. The pulse inductance $L_{PULSE}$ 58, the diode $D_P$ 60, the pulse switch 54 and the pulse capacitor $C_{PULSE}$ 56 may be coupled in series to form a first branch of the pulse circuit 52, where the components of the first branch may be configured to facilitate pulse current shaping and timing. Also, reference numeral 62 is representative of a pulse circuit current $I_{PULSE}$ that may flow through the pulse circuit 52.

In accordance with aspects of the present invention, the MEMS switch 20 may be rapidly switched (for example, on the order of picoseconds or nanoseconds) from a first closed state to a second open state while carrying a current albeit at a near-zero voltage. This may be achieved through the combined operation of the load circuit 40, and pulse circuit 52 including the balanced diode bridge 28 coupled in parallel across contacts of the MEMS switch 20.

Figure 3:
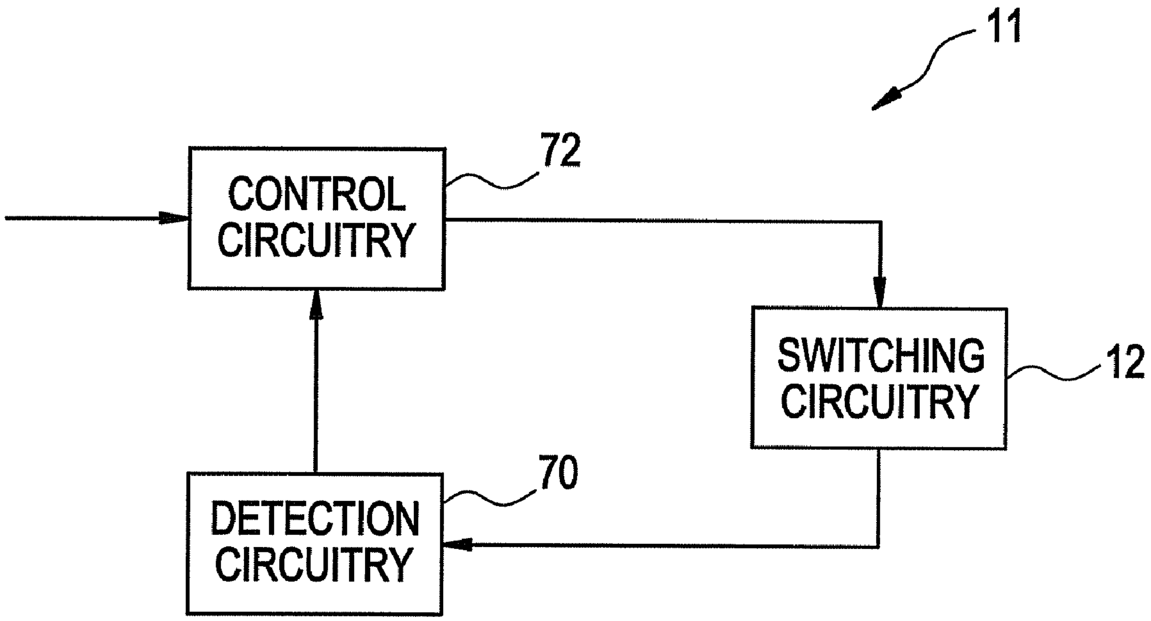
FIG. 3 is a block diagram of an exemplary MEMS based switching system in accordance with an embodiment of the invention and alternative to the system depicted in FIG. 1.

Reference is now made to FIG. 3, which illustrates a block diagram of an exemplary soft switching system 11, in accordance with aspects of the present invention. As illustrated in FIG. 3, the soft switching system 11 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"). The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current. In one embodiment, the control circuitry 72 may be configured to facilitate arc-less switching of one or more MEMS switches comprising at least part of the switching circuitry 12.

In accordance with one aspect of the invention, the soft switching system 11 may be configured to perform soft or point-on-wave (PoW) switching whereby one or more MEMS switches in the switching circuitry 12 may be closed at a time when the voltage across the switching circuitry 12 is at or very close to zero, and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 12 is at or close to zero, the soft switching system 11 can be designed so that the current in the last switch to open in the switching circuitry 12 falls within the design capability of the switch. As alluded to above and in accordance with one embodiment, the control circuitry 72 may be configured to synchronize the opening and closing of the one or more MEMS switches of the switching circuitry 12 with the occurrence of a zero crossing of an alternating source voltage or an alternating load circuit current.

Figure 4:
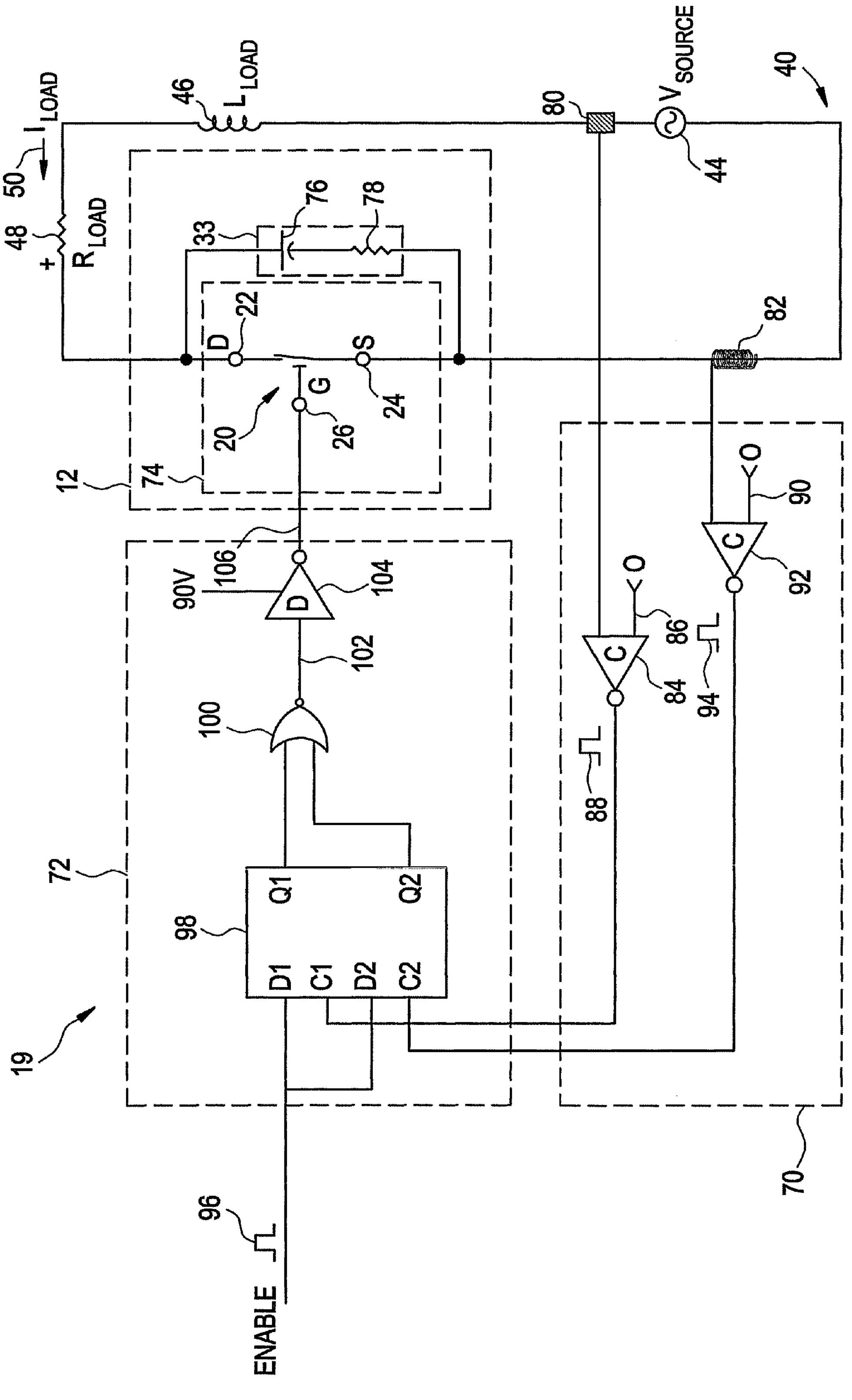
FIG. 4 is a schematic diagram illustrating the exemplary MEMS based switching system depicted in FIG. 3.

Turning to FIG. 4, a schematic diagram 19 of one embodiment of the soft switching system 11 of FIG. 3 is illustrated. In accordance with the illustrated embodiment, the schematic diagram 19 includes one example of the switching circuitry 12, the detection circuitry 70 and the control circuitry 72.

Although for the purposes of description, FIG. 4 illustrates only a single MEMS switch 20 in switching circuitry 12, the switching circuitry 12 may nonetheless include multiple MEMS switches depending upon, for example, the current and voltage handling requirements of the soft switching system 11. In one embodiment, the switching circuitry 12 may include a switch module including multiple MEMS switches coupled together in a parallel configuration to divide the current amongst the MEMS switches. In another embodiment, the switching circuitry 12 may include an array of MEMS switches coupled in a series configuration to divide the voltage amongst the MEMS switches. In yet a further embodiment, the switching circuitry 12 may include an array of MEMS switch modules coupled together in a series configuration to concurrently divide the voltage amongst the MEMS switch modules and divide the current amongst the MEMS switches in each module. In one embodiment, the one or more MEMS switches of the switching circuitry 12 may be integrated into a single package 74.

The exemplary MEMS switch 20 may include three contacts. In one embodiment, a first contact may be configured as a drain 22, a second contact may be configured as a source 24, and the third contact may be configured as a gate 26. In one embodiment, the control circuitry 72 may be coupled to the gate contact 26 to facilitate switching a current state of the MEMS switch 20. Also, in certain embodiments, damping circuitry (snubber circuit) 33 may be coupled in parallel with the MEMS switch 20 to delay appearance of voltage across the MEMS switch 20. As illustrated, the damping circuitry 33 may include a snubber capacitor 76 coupled in series with a snubber resistor 78, for example.

Additionally, the MEMS switch 20 may be coupled in series with a load circuit 40 as further illustrated in FIG. 4. In a presently contemplated configuration, the load circuit 40 may include a voltage source $V_{SOURCE}$ 44, and may possess a representative load inductance $L_{LOAD}$ 46 and a load resistance $R_{LOAD}$ 48. In one embodiment, the voltage source $V_{SOURCE}$ 44 (also referred to as an AC voltage source) may be configured to generate the alternating source voltage and the alternating load current $I_{LOAD}$ 50.

As previously noted, the detection circuitry 70 may be configured to detect occurrence of a zero crossing of the alternating source voltage or the alternating load current $I_{LOAD}$ 50 in the load circuit 40. The alternating source voltage may be sensed via the voltage sensing circuitry 80 and the alternating load current $I_{LOAD}$ 50 may be sensed via the current sensing circuitry 82. The alternating source voltage and the alternating load current may be sensed continuously or at discrete periods for example.

A zero crossing of the source voltage may be detected through, for example, use of a comparator such as the illustrated zero voltage comparator 84. The voltage sensed by the voltage sensing circuitry 80 and a zero voltage reference 86 may be employed as inputs to the zero voltage comparator 84. In turn, an output signal 88 representative of a zero crossing of the source voltage of the load circuit 40 may be generated. Similarly, a zero crossing of the load current $I_{LOAD}$ 50 may also be detected through use of a comparator such as the illustrated zero current comparator 92. The current sensed by the current sensing circuitry 82 and a zero current reference 90 may be employed as inputs to the zero current comparator 92. In turn, an output signal 94 representative of a zero crossing of the load current $I_{LOAD}$ 50 may be generated.

The control circuitry 72, may in turn utilize the output signals 88 and 94 to determine when to change (for example, open or close) the current operating state of the MEMS switch 20 (or array of MEMS switches). More specifically, the control circuitry 72 may be configured to facilitate opening of the MEMS switch 20 in an arc-less manner to interrupt or open the load circuit 40 responsive to a detected zero crossing of the alternating load current $I_{LOAD}$ 50. Additionally, the control circuitry 72 may be configured to facilitate closing of the MEMS switch 20 in an arc-less manner to complete the load circuit 40 responsive to a detected zero crossing of the alternating source voltage.

In one embodiment, the control circuitry 72 may determine whether to switch the present operating state of the MEMS switch 20 to a second operating state based at least in part upon a state of an Enable signal 96. The Enable signal 96 may be generated as a result of a power off command in a contactor application, for example. In one embodiment, the Enable signal 96 and the output signals 88 and 94 may be used as input signals to a dual D flip-flop 98 as shown. These signals may be used to close the MEMS switch 20 at a first source voltage zero after the Enable signal 96 is made active (for example, rising edge triggered), and to open the MEMS switch 20 at the first load current zero after the Enable signal 96 is deactivated (for example, falling edge triggered). With respect to the illustrated schematic diagram 19 of FIG. 4, every time the Enable signal 96 is active (either high or low depending upon the specific implementation) and either output signal 88 or 94 indicates a sensed voltage or current zero, a trigger signal 102 may be generated. In one embodiment, the trigger signal 102 may be generated via a NOR gate 100, for example. The trigger signal 102 may in turn be passed through a MEMS gate driver 104 to generate a gate activation signal 106 which may be used to apply a control voltage to the gate 26 of the MEMS switch 20 (or gates in the case of a MEMS array).

As previously noted, in order to achieve a desirable current rating for a particular application, a plurality of MEMS switches may be operatively coupled in parallel (for example, to form a switch module) in lieu of a single MEMS switch. The combined capabilities of the MEMS switches may be designed to adequately carry the continuous and transient overload current levels that may be experienced by the load circuit. For example, with a 10-amp RMS motor contactor with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount or level of current that will be flowing at the moment of switching.

Figure 5:
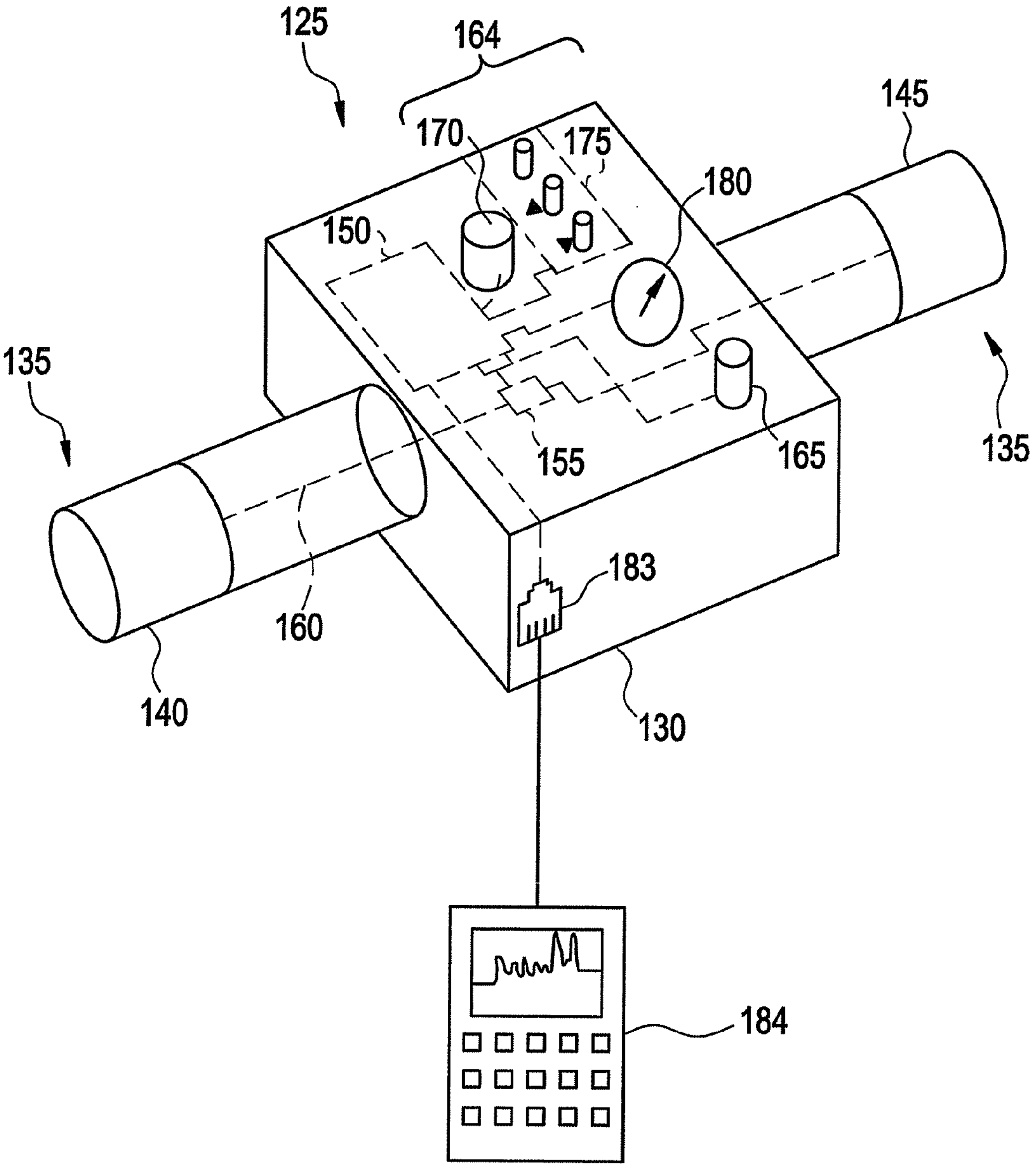
FIG. 5 is a pictorial diagram of a current control device in accordance with an embodiment of the invention.

Referring now to FIG. 5, a pictorial diagram of an embodiment of a current control device 125 is depicted. The current control device 125 includes a main body 130 and a set of conduction interfaces 135. The set of conduction interfaces 135 include a first interface 140 disposed at one end of the device 125 and a second interface 145 disposed at an opposite end of the device 125. The set of conduction interfaces 135 have a geometry of a defined fuse terminal geometry, such that a current path 160 of the current control device 125 is directly interchangeable with a standard fuse with the defined fuse terminal geometry, the set of conduction interfaces 135 of the current control device 125 therefore having the same dimensions as terminals, or conduction interfaces of the standard fuse.

Disposed within the body 130 of the device 125 is a control circuit 150 (also herein referred to as control circuitry), and a MEMS switch 155 (similar to that of reference numeral 12 discussed above in connection with FIG. 1). The MEMS switch 155 is disposed between the first interface 140 and the second interface 145 such that the first interface 140, second interface 145, and MEMS switch 155 define the current path 160 integrally arranged with the control circuitry 150 disposed within the body 130 of the device 125. The MEMS switch 155 is responsive to the control circuitry 150 to open the current path 160 and thereby interrupt an electrical current passing through the current path 160.

In an embodiment, the device 125 further includes at least one of the HALT arc suppression circuit 14, voltage snubber circuit 33, and the soft-switching system 11 (also herein referred to as a soft-switching circuit) described above. It will be appreciated that the HALT arc suppression circuit 14, voltage snubber circuit 33, and soft-switching system 11 may be discrete circuits or integrated within the control circuitry 150.

Functions of the control circuit 150 include time-based determinations, such as setting a trip-time curve based upon trip parameters of a defined trip event, for example. The control circuit 150 further provides for voltage and current measurement, programmability or adjustability of the MEMS switch 155, control of the closing/reclosing logic of the MEMS switch 155, and interaction with the HALT device 14 to provide cold switching, or switching without arcing, for example. A power draw of the control circuit 150 is minimal and can be provided by line inputs, without a need to provide any additional external supply of power. It will be appreciated that various degrees of integration (or discreteness) of the foregoing functionalities provided by the control circuit 150 are contemplated as within the scope of the invention, and that embodiments described herein are for the purpose of illustration, not limitation. The control circuitry 150 and MEMS switch 155 may be configured for use with either alternating current (AC) or direct current (DC).

The control circuitry 150 is configured to measure parameters related to the electrical current passing through the current path 160, and to compare the measured parameters with those corresponding to one or more defined trip events, such as an amount of electrical current and time of an over-current event for example. In response to a parameter of electrical current passing through the conduction path 160, such as an instantaneous increase in electrical current of a magnitude great enough to indicate a short circuit, the control circuitry 150 generates a signal that causes the MEMS switch 155 to open and cause a transfer of short circuit energy from the MEMS switch 155 to the HALT device 14 (best seen with reference to FIG. 1) and thereby facilitate interruption of the electrical current passing through the current path 160. Additionally, in response to a parameter such as a defined duration of increase in the electrical current of a magnitude less than a short circuit, which can be indicative of a defined timed over-current fault, the control circuitry 150 likewise generates a signal that causes the MEMS switch 155 to open and interrupt the electrical current.

In an embodiment, the current control device 125 further includes one or more user interfaces 164 in signal connection with the control circuit 150 to facilitate communication of an operational status and definition of operational parameters of the device 125. An indicator 165, such as a light emitting diode (LED) for example, is responsive to the control circuit 150 and indicates that the defined trip event has occurred and has resulted in an opening of the MEMS switch 155 to facilitate interruption of electrical current through the current path 160. An activator 170, such as a reset button, provides to the control circuit 150 a signal, or command to close the MEMS switch 155 subsequent to the defined trip event, which previously resulted in an opening of the MEMS switch 155 to facilitate interruption of the current flow. An input device 175, such as a set of pushbuttons (one pushbutton to select a parameter and two other pushbuttons to either increment or decrement the selected parameter, for example) or dials for example, inputs or defines one or more parameters of the defined trip event, as well as operational parameters of the device 125. A display 180, such as an LED or liquid crystal display (LCD) can be used in conjunction with input 175 for selecting and defining the parameter, as well as to display a value of one or more of the defined parameters.

An embodiment includes a communications connection 183 in signal communication with the control circuitry 150, which provides for external networking communication with an external device 184, such as at least one of control, diagnostic, and monitoring device including a computer, meter, or oscilloscope, for example. The communications connection 183 provides a communication link for monitoring a present condition of the device 125, such as to diagnose a status of the device 125 and/or observe the electrical current passing through the current path 160 via the external device 184 for example. The communications connection 183 also provides a communication link for manually controlling the device 125, via the external device 184, such as to change an ON/OFF state of the MEMS switch 155 to provide functionality associated with a contactor, for example. In an embodiment, the communications connection 183 is one of a wired and a wireless communication link. Additionally, the communications connection 183 may link together one or more devices 125, as will be described further below.

Figure 6:
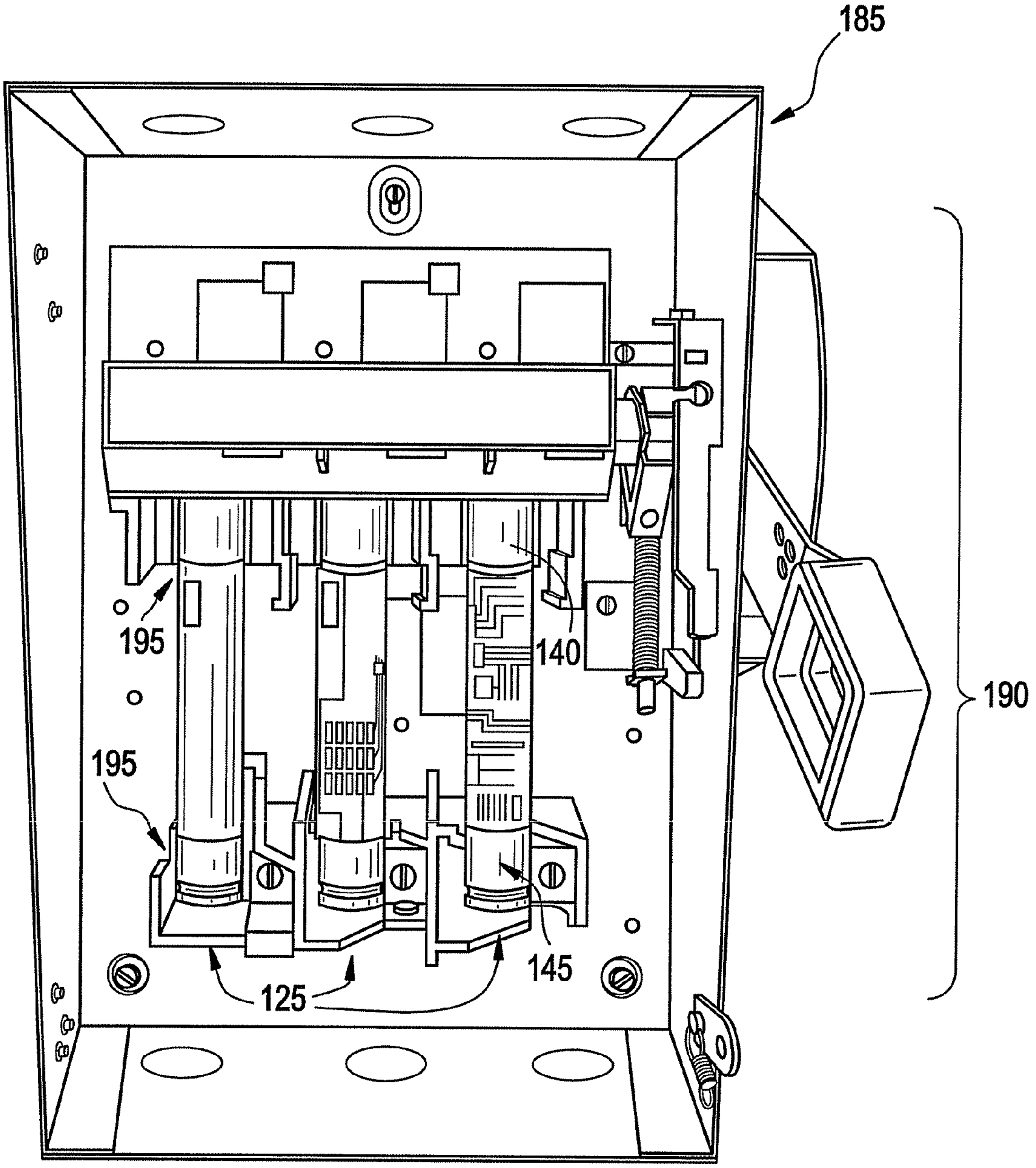
FIG. 6 is a drawing of an enclosure including a current control device in accordance with embodiments of the invention.

Referring now to FIG. 6, an enclosure 185 including embodiments of the current control device 125 is depicted. The enclosure 185 includes a fused disconnect 190 that is configured for use in conjunction with fuses that have a defined dimension. One of skill in the art will appreciate that the enclosure 185 depicted in FIG. 6 provides only sufficient space for inclusion of the disconnect 190, and is absent sufficient space for inclusion of a contactor, overload relay, and control transformer (not specifically shown). In an application of the enclosure 185 including the fused disconnect 190 in conjunction with fuses, it is desirable to provide at least one additional enclosure that includes at least one of an appropriate contactor, overload relay, and control transformer. Alternatively, a size of the enclosure 185 can be increased to provide therein the necessary space for the fused disconnect 190 in addition to at least one of the contactor, overload relay, and control transformer.

In view of the foregoing, it will be appreciated that embodiments of the current control device 125 provide functionality of standard fuses to reduce energy associated with short-circuit current. Additionally, embodiments of the current control device 125 can provide functionality of standard contactors to open and close the current path 160 as well as functionality of the combination of the contactor and overload relay to respond to the timed over current fault and interrupt the electrical current passing through the current path 160. Furthermore, the current control device 125 provides functionality of standard circuit breakers, to allow an embodiment of the device 125 to be reset, and the conduction path closed following a trip event without a need to replace the device. Accordingly, use of the current control device 125 provides the combination of aforementioned functionalities at a given ampere/voltage rating while allowing use of an enclosure 185 having smaller overall dimensions than an enclosure sized to enclose standard components (disconnect, contactor, overload relay, and control transformer) in order to provide the same combination of functionalities at the same given ampere/voltage rating. Stated alternatively, the current control device 125 described herein provides a reduced space requirement for a given functionality at a given current rating.

The first interface 140 and second interface 145 are disposed and dimensioned to have the geometry of interfaces or terminal geometry of a defined fuse. Therefore, use of the current control device 125 is interchangeable into enclosures 185 that have fuse receptacles 195, such as clips or holders for example, which are configured to interface with standard fuses. Such fuse receptacles 195, in conjunction with an accompanying available space surrounding the fuse may be known in the art as a "fuse hole". Accordingly, the current control device 125 is configured to fit within the "fuse hole" and is compatible for retrofit use with fused disconnects 190 having fuse receptacles 195 that are already in an installed condition and in use, thereby providing the functionality and advantages described herein.

Figure 7:
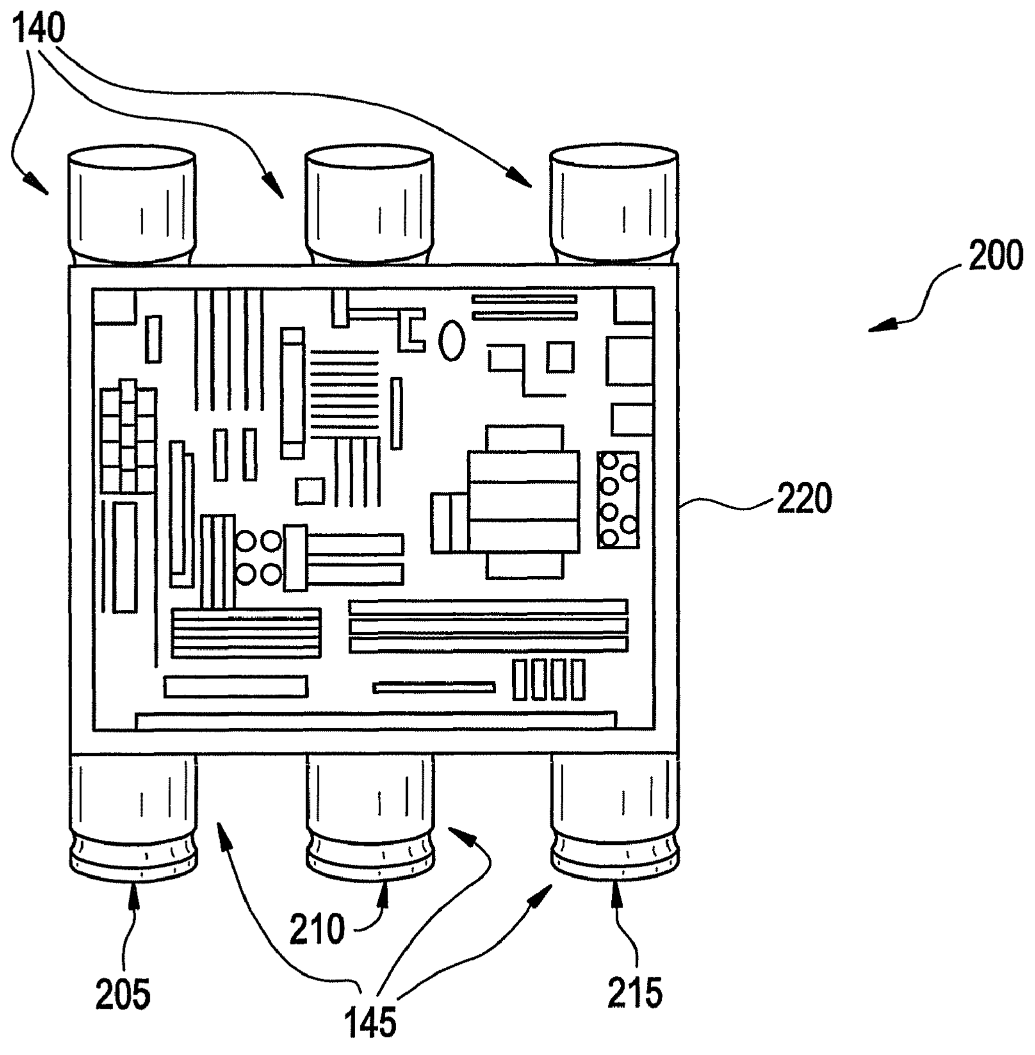
FIG. 7 is a drawing of a current control device in accordance with an embodiment of the invention.

FIG. 7 depicts an embodiment of a current control device 200 configured for use in conjunction with a poly phase system, such as a three-phase system for example. The device 200 includes a plurality of current paths 205, 210, 215, each of which are integrally arranged and in signal communication with control circuitry 220. Each current path 205, 210, 215 includes the first interface 140, second interface 145, and the MEMS switch 155 disposed between the first and second interfaces 140, 145 as disclosed herein. As described above, the control circuitry 220 measures the electrical current passing through the plurality of current paths 205, 210, 215. In response to any one of the plurality of current paths 205, 210, 215 meeting the defined trip event, the control circuitry 220 generates and provides to each MEMS switch 155 a signal to interrupt the electrical current passing through all of the current paths 205, 210, 215. Therefore, a trip event in any single phase of a poly phase system will result in an interruption of all current phases, thereby preventing single phasing and any associated damage that may result from continued operation via the remaining phases.

Figure 8:
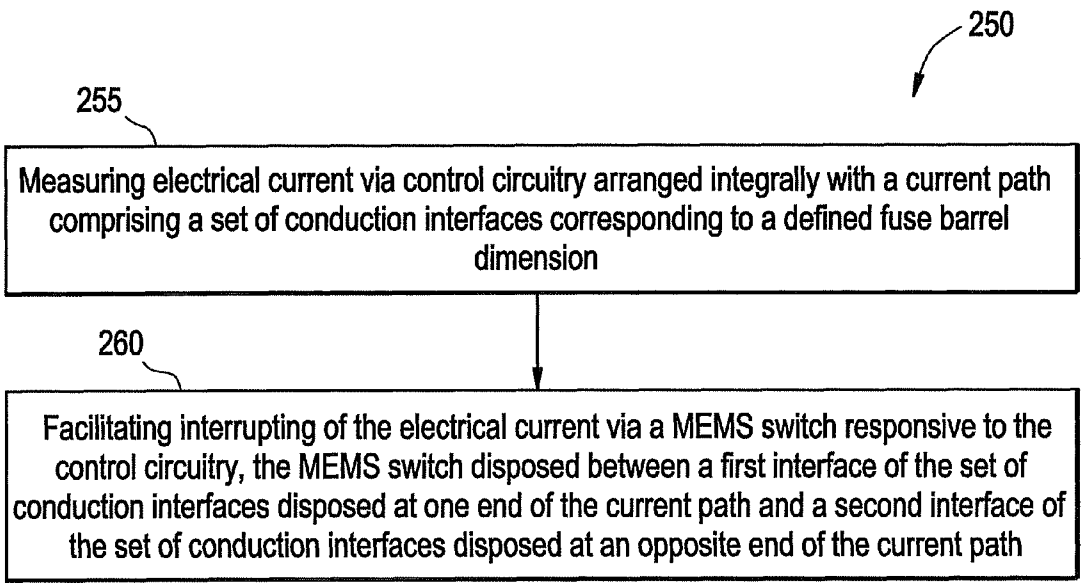
FIG. 8 is a flowchart of process steps of method of controlling current in accordance with an embodiment of the invention.

FIG. 8 depicts a flowchart of process steps of a method of controlling an electrical current passing through a current path, such as the current path 160. The method begins at Step 255 by measuring the electrical current via control circuitry 150 arranged integrally with the current path 160, which includes the set of conduction interfaces 135 corresponding to interfaces of a defined fuse barrel dimension. The method includes facilitating interrupting, at Step 260, of the electrical current via the MEMS switch 155 responsive to the control circuitry 150.

In an embodiment, the interrupting at Step 260 includes determining, by the control circuitry 150, if the measured electrical current meets or exceeds the parameter of the defined trip event. In response to determining that the measured electrical current does meet or exceed the parameter of the defined trip event, the control circuitry 150 makes available to the MEMS switch 155 an interruption signal to cause the MEMS switch 155 to open and interrupt the flow of current passing through the current path 160.

In an embodiment, the current path 160 includes a plurality of current paths 205, 210, 215 of the poly phase system, and the MEMS switch 155 includes a plurality of MEMS switches 155, each of the plurality of MEMS switches 155 being associated with a corresponding one of the plurality of current paths 205, 210, 215. The measuring current at Step 255 includes measuring the electrical current via the control circuitry 220 arranged integrally with each current path 205, 210, 215 of the plurality of current paths 205, 210, 215. The facilitating interrupting, at Step 260 includes facilitating interrupting of the electrical current via the plurality of MEMS switches 155 corresponding to each current path 205, 210, 215 of the plurality of current paths 205, 210, 215. Further, the interrupting includes determining, by the control circuitry 220, if the electrical current of any one of the plurality of current paths 205, 210, 215 meets or exceeds the parameter of the defined trip event. In response to determining that the electrical current of any one of the plurality of current paths 205, 210, 215 meets or exceeds the parameter of the defined trip event, the method includes making available to each MEMS switch 155 of the plurality of MEMS switches 155 an interruption signal to protect all of the phases of the poly phase system. In an embodiment, the facilitating interrupting, at Step 260, includes transferring electrical energy from the MEMS switch 155 to the HALT device 14 in response to the MEMS switch 155 changing state from closed to open.

While an embodiment of the invention has been depicted having one control circuit 220 in physical and signal connection with each current path, it will be appreciated that the scope of the invention is not so limited, and that linking of separate current paths, such as current paths 205, 210, 215 via the communication connection 183 (best seen with reference to FIG. 5), which may be at least one of a wired and a wireless connection, is contemplated as within the scope of embodiments of the invention.

While an embodiment of the current control device 125 has been depicted with a cylindrical barrel shape, it will be appreciated that the scope of the invention is not so limited, and that the invention will also apply to current control devices 125 that have any variety of geometric shapes such that the set of conduction interfaces 135 are compatible with fuse receptacles 195 corresponding to a defined fuse terminal geometry. Furthermore, it will be appreciated that embodiments of the current control device 125 will include the set of conduction interfaces 135 having geometry disposed and dimensioned to correspond to terminals of fuses that have geometries that may not include a cylindrical fuse barrel, such as fuses having knife-edge terminal geometry, rectangular fuses, square fuses, and spade fuses for example, and that the set of conduction interfaces 135 are compatible with enclosures 185 that have fuse receptacles 195 corresponding to such fuse terminals.

As disclosed, some embodiments of the invention may include some of the following advantages: the ability to provide current protection to either alternating current or direct current paths; the ability to retrofit presently installed fuse holders; the ability to improve protection compared to fuses and circuit breakers by providing a faster response time and reduced let-through energy; the ability to program parameters of trip events; the ability to reset a circuit protection device utilized within a fuse receptacle; the ability to provide status indication, remote on/off selection, and confirmation of parameter settings via a user interface; the ability to provide phase imbalance protection with a fuse disconnect enclosure; and the ability to network the current protection device.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A poly-phase current control device, comprising:

a first current path;

a first set of conduction interfaces comprising a first interface disposed at one end of the first current path and a second interface disposed at an opposite end of the first current path, wherein the first interface and the second interface are configured to couple with a fuse terminal;

a first micro electromechanical system (MEMS) switch disposed between the first interface and the second interface;

a second current path;

a second set of conduction disposed proximate the first set of conduction interfaces, the second set of conduction interfaces comprising a third interface disposed at one end of the second current path and a fourth interface disposed at an opposite end of the second current path, wherein the third interface and the fourth interface are configured to couple with the fuse terminal;

a second micro electromechanical system (MEMS) switch disposed between the third interface and the fourth interface;

control circuitry in signal communication with the first current path and second current path, wherein the control circuitry configured to facilitate an interruption in response to an electrical current passing through any one of the first current path and second current path meeting a parameter of a defined trip event, via the first MEMS switch and second MEMS switche;

an activator in signal communication with the control circuitry and configured to close the first MEMS switch and second MEMS switch in response to a signal subsequent to the defined trip event;

an indicator in signal communication with the control circuitry to indicate an occurrence of the defined trip event; and an input device in signal communication with the control circuitry and configured to transmit to the control circuitry the parameter of the defined trip event.

2. The poly-phase current control device of claim 1, further comprising:

a third current path;

a third set of conduction interfaces disposed proximate the second set of conduction interfaces, the third set of conduction interfaces comprising a fifth interface disposed at one end of the third current path and a sixth interface disposed at an opposite end of the second current path, wherein the fifth interface and the sixth interface are configured to couple with the fuse terminal; and a third micro electromechanical system (MEMS) switch disposed between the fifth interface and the sixth interface;

wherein the control circuitry is responsive to an electrical current passing through any one of the first current path, the second current path, and third current path meeting the parameter of the defined trip event to facilitate interruption, via the first MEMS switch, the second MEMS switch, and third MEMS switch.

3. The poly-phase current control device of claim 1, wherein the control circuitry is responsive to the electrical current meeting a parameter of a defined trip event to open the first and second MEMS switches.

4. The poly-phase current control device of claim 3, wherein the parameter of the defined trip event comprises at least one of time, level of electrical current, or a combination thereof.

5. The poly-phase current control device of claim 1, further comprising a Hybrid Arcless Limiting Technology (HALT) arc suppression circuit disposed in electrical communication with first and second MEMS switches to receive electrical energy from the first and second MEMS switches in response to the first and second MEMS switches in response to a change in state from closed to open.

6. The poly-phase current control device of claim 1, further comprising a voltage snubber circuit in parallel connection with the first and second MEMS switches.

7. The poly-phase current control device of claim 1, further comprising a soft-switching circuit to synchronize a change in state of the first and second MEMS switches with an occurrence of a zero crossing of at least one of an alternating electrical current passing through an associated conduction path and an alternating voltage of the associated conduction path relative to an absolute zero reference.

8. A method of controlling electrical current passing through at least two current paths, the method comprising:

measuring the electrical current via control circuitry arranged integrally with the at least two current paths, a first current path of the at least two current paths comprising a first set of conduction interfaces having geometry of a defined fuse terminal geometry, and a second current path of the at least two current paths comprising a second set of conduction interfaces having geometry of the defined fuse terminal geometry; and facilitating interrupting of the electrical current via at least two MEMS switches responsive to the control circuitry and a defined trip event, a first MEMS switch of the at least two MEMS switches being disposed between a first interface of the first set of conduction interfaces disposed at one end of the first current path and a second interface of the first set of conduction interfaces disposed at an opposite end of the first current path, a second MEMS switch of the at least two MEMS switches being disposed between a first interface of the second set of conduction interfaces disposed at one end of the second current path and a second interface of the second set of conduction interfaces disposed at an opposite end of the second current path;

wherein the control circuitry comprises an activator in signal communication with the control circuitry to close both of the first and second MEMS switches on command subsequent to the defined trip, an indicator in signal communication with the control circuitry to indicate an occurrence of the defined trip event, and an input device in signal communication with the control circuitry to input the parameter of the defined trip event.

* * * * *